(12) United States Patent
Hasselmann et al.

(10) Patent No.: US 11,141,720 B2
(45) Date of Patent: Oct. 12, 2021

(54) COATING APPARATUS AND METHOD

(71) Applicant: UMICORE AG & CO. KG, Hanau-Wolfgang (DE)

(72) Inventors: Wolfgang Hasselmann, Rheinfelden (DE); Stéphane Masson, Village-neuf (FR)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/628,301

(22) PCT Filed: Jul. 5, 2018

(86) PCT No.: PCT/EP2018/068187
§ 371 (c)(1),
(2) Date: Jan. 3, 2020

(87) PCT Pub. No.: WO2019/008076
PCT Pub. Date: Jan. 10, 2019

(65) Prior Publication Data
US 2020/0215522 A1 Jul. 9, 2020

(30) Foreign Application Priority Data
Jul. 6, 2017 (EP) .................................... 17180017

(51) Int. Cl.
*B01J 35/00* (2006.01)
*B01J 35/04* (2006.01)
(Continued)

(52) U.S. Cl.
CPC .......... *B01J 35/04* (2013.01); *B01D 46/2418* (2013.01); *B01J 35/0006* (2013.01);
(Continued)

(58) Field of Classification Search
CPC .......................... B01J 37/0215; B01J 35/0006; B01J 37/0244; B01J 35/04; B01J 37/0246;
(Continued)

(56) References Cited

U.S. PATENT DOCUMENTS

| 3,959,520 A | 5/1976 | Hoyer et al. |
| 4,039,482 A | 8/1977 | Hoyer et al. |

(Continued)

FOREIGN PATENT DOCUMENTS

| DE | 197 81 838 84 | 8/2008 |
| DE | 10 2009 009 579 B4 | 1/2015 |

(Continued)

OTHER PUBLICATIONS

International Search Report for PCT/EP2018/068187, dated Sep. 13, 2018 (3pgs.).

(Continued)

*Primary Examiner* — Timothy C Vanoy
(74) *Attorney, Agent, or Firm* — Smith, Gambrell & Russell, LLP

(57) ABSTRACT

The present invention is directed to an apparatus and a respective process, which can be used in the production of exhaust catalysts. In particular, the present apparatus is used in a process to supply the liquid coating slurry to substrates, like honeycomb monoliths.

22 Claims, 4 Drawing Sheets

Figure 1:
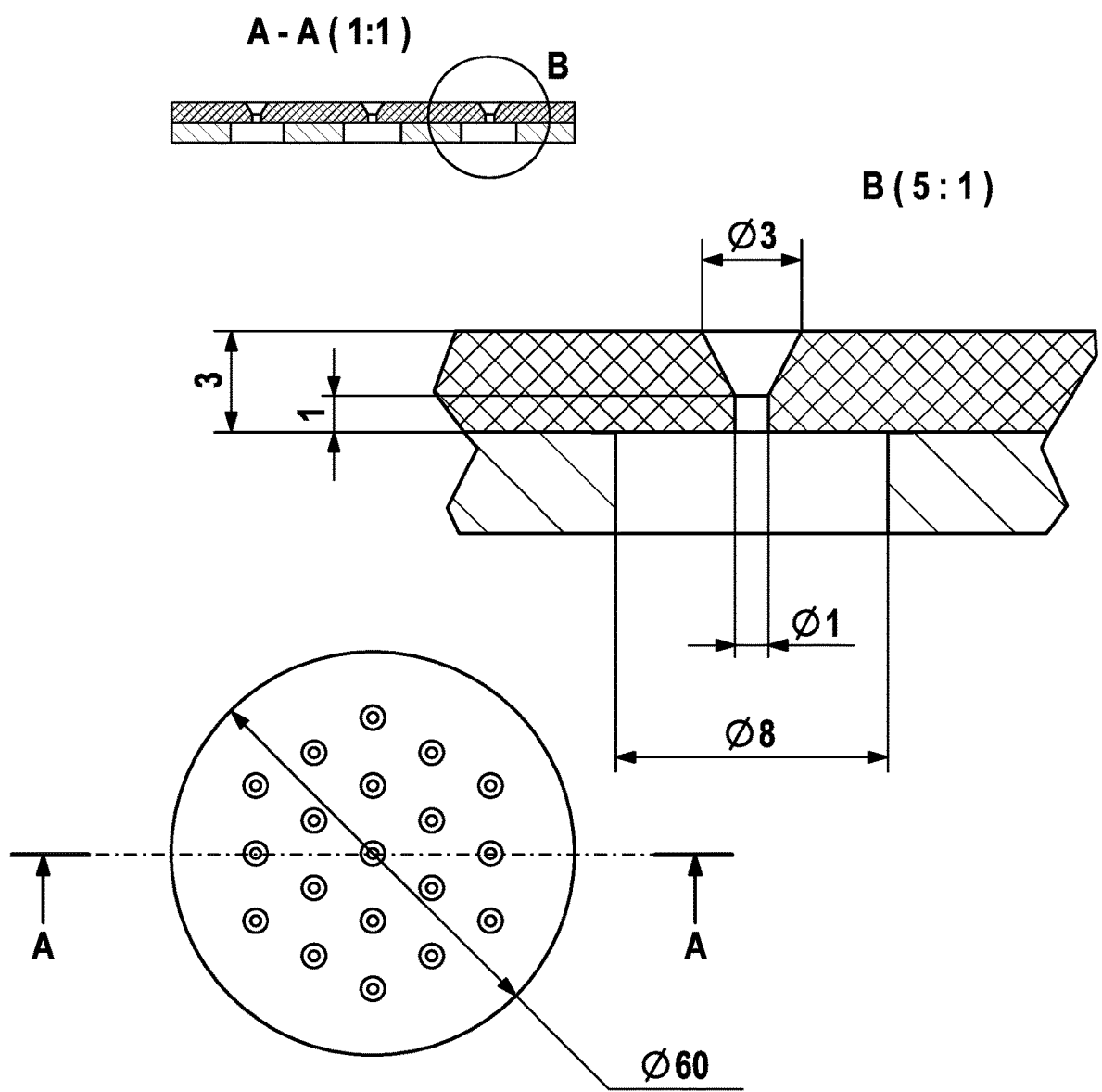

(51) Int. Cl.
*B01D 46/24* (2006.01)
*B01J 37/02* (2006.01)

(52) U.S. Cl.
CPC ............ *B01D 2255/1021* (2013.01); *B01D 2255/1023* (2013.01); *B01D 2255/50* (2013.01); *B01D 2255/9155* (2013.01); *B01J 37/0215* (2013.01); *B01J 37/0244* (2013.01); *B01J 37/0246* (2013.01); *F01N 2330/06* (2013.01)

(58) Field of Classification Search
CPC ........ B01D 2255/50; B01D 2255/9155; B01D 46/2418; B01D 2255/1023; B01D 2255/1021; F01N 2330/06; B05D 7/22
See application file for complete search history.

(56) References Cited

U.S. PATENT DOCUMENTS

| | | | |
|---|---|---|---|
| 4,191,126 A | | 3/1980 | Reed et al. |
| 4,208,454 A | * | 6/1980 | Reed .................. B01J 35/04 118/50 |
| 4,411,856 A | | 10/1983 | Montierth |
| 4,550,034 A | | 10/1985 | Shimrock et al. |
| 4,609,563 A | | 9/1986 | Shimrock et al. |
| 5,866,210 A | | 2/1999 | Rosynsky et al. |
| 6,149,973 A | | 11/2000 | Foerster et al. |
| 6,478,874 B1 | | 11/2002 | Rosynsky et al. |
| 6,548,105 B2 | | 4/2003 | Kiessling et al. |
| 6,627,257 B1 | | 9/2003 | Foerster et al. |
| 6,753,294 B1 | | 6/2004 | Brisley et al. |
| 8,302,557 B2 | | 11/2012 | Goshima et al. |
| 8,476,559 B2 | | 7/2013 | Hasselmann |
| 8,794,178 B2 | | 8/2014 | Mergner et al. |
| 9,144,796 B1 | | 9/2015 | Bennett et al. |
| 2002/0178707 A1 | | 12/2002 | Vance et al. |
| 2004/0023799 A1 | * | 2/2004 | Aderhold .................. B05D 7/22 502/439 |
| 2007/0001283 A1 | | 6/2007 | Suzuki et al. |
| 2007/0128254 A1 | | 6/2007 | Heuer et al. |
| 2008/0107806 A1 | | 5/2008 | Mergner et al. |
| 2021/0008534 A1 | * | 1/2021 | Arulraj .................. B01J 35/04 |

FOREIGN PATENT DOCUMENTS

| | | | | |
|---|---|---|---|---|
| EP | 1 900 442 A1 | 3/2008 | | |
| EP | 2 415 522 A1 | 2/2012 | | |
| EP | 2 321 048 B1 | 5/2014 | | |
| JP | 2006-21128 A | 1/2006 | | |
| WO | WO 97/23275 A1 | * | 7/1997 | ............ F01N 3/281 |
| WO | 97/48500 | 12/1997 | | |
| WO | 99/47260 | 9/1999 | | |
| WO | 2007/007370 A1 | 1/2007 | | |
| WO | 2010/114132 A1 | 10/2010 | | |
| WO | 2011/080525 A1 | 7/2011 | | |
| WO | 2011/098450 A1 | 8/2011 | | |
| WO | 2015/140630 A1 | 9/2015 | | |
| WO | 2015/145122 A2 | 10/2015 | | |
| WO | 2016/023808 A1 | 2/2016 | | |
| WO | 2016/066462 A1 | 5/2016 | | |

OTHER PUBLICATIONS

Written Opinion of the International Searching Authority for PCT/EP2018/068187, dated Sep. 13 2018 (5pgs.).
E. Tombacz, et al. "pH-dependent aggregation state of highly dispersed alumina, titania and silica particles in aqueous medium" Suspensions and Emulsions (1995) 98:160-168.
International Preliminary Report on Patentability dated Jan. 7, 2020 for International Patent Application No. PCT/EP2018/068187 (6 pages).
DIN EN ISO 3104. Nov. 2017. pp. 1-32 in German and pp. 32-59 in English.
DIN 66134. Feb. 1998, 7 pages in German with Machine Translation.
DIN 66133. Jun. 1993, 3 pages in German with Machine Translation.
Zhou, Z., et al. Chemical and physical control of the rheology of concentrated metal oxide suspensions. Chemical Engineering Science. 2001. vol. 56, pp. 2901-2920.
Elastomer, Wikipedia, https://en.wikipedia.org/wiki/Elastomer accessed Feb. 11, 2021.
Aerosol, Wikipedia, https://en.wikipedia.org/wiki/Aerosol accessed Feb. 11, 2021.
Steam, Wikipedia, https://en.wikipedia.org/wiki/Steam accessed Feb. 11, 2021.
European Search Report dated Jan. 1, 2018 for European Patent Application No. 17180017.0. 4 pages.
Communication from Examining Division dated Feb. 1, 2018 in European Patent Application No. 17180017.0 (4 pages).
Communication from Examining Division dated Sep. 13, 2018 in European Patent Application No. 17180017.0 (5 pages).
Examination Report dated Jul. 13, 2021 in Indian Patent Application No. 202047004636 (6 pages).

* cited by examiner

COATING APPARATUS AND METHOD

The present invention is directed to an apparatus and a respective process, which can be used in the production of exhaust catalysts. In particular, the present apparatus is used in a process to supply the liquid coating slurry to substrates, like honeycomb monoliths.

Automotive exhaust abatement is of great importance as numbers of cars are growing tremendously, especially in East Asian countries. Several clean air acts around the world try to keep the pollution of the air by automobiles at respective low levels. More and more stringent legislation in this regard forces car manufacturers and suppliers to apply techniques for abatement of noxious pollutants stemming from internal combustion engines of vehicles. One area of techniques concerns the catalytic combustion of exhaust pollutants on or in so called honeycomb monoliths either of the flow-through or the wall-flow type.

Normally such monolith bodies are made out of e.g. metal or cordierite and have to be coated by a layer being active in catalytically destroying the noxious pollutants in the exhaust under driving conditions. A great improvement has been achieved by chemically modifying the catalytically active layers with respect to the main reactions of the pollutants under oxidative or reductive exhaust environment. A second approach is to apply certain coating strategies in order to gain an activity as high as possible with the material at hand. Hence, several patent applications already deal with standard processes and devices/tools to coat said monolithic carriers. E.g. the following selection of patent publications, respectively, highlight aspects of such processes, like coating apparatus, methods for coating, or special units of a coating station etc. (WO9947260A1; U.S. Pat. Nos. 4,550,034; 4,039,482; WO9748500A1; U.S. Pat. No. 6,478,874B1; US20020178707A1; DE19781838T1; WO2011080525A1; U.S. Pat. Nos. 4,191,126; 6,627,257B1; U.S. Pat. No. 6,548,105B2; US20080107806A1; U.S. Pat. Nos. 6,149,973; 6,753,294B1).

In principle the coating techniques can be divided in two general classes. A first class is concerned with a coating strategy in which the liquid coating slurry is subjected to the vertically orientated substrate (i.e. support body or monolith carrier) from below. The second class of coating techniques discusses the application of the liquid coating slurry to the top of the vertically orientated substrate. In WO9947260A1 a top-down coating technique is disclosed in which a monolithic support coating apparatus comprises means for dosing a pre-determined quantity of a liquid component, said quantity being such that it is substantially wholly retained within the intended support, liquid component containment means locatable on the top of a support to receive said quantity of liquid component, and pressure means capable of withdrawing the liquid component from the containment means into at least a portion of the support. Further techniques working this way can be found in U.S. Pat. No. 9,144,796B1, WO2015145122A2, EP1900442A1 or EP2415522A1.

In particular, the EP1900442A1 and the EP2415522A1 are concerned with the problem to apply an even liquid washcoat slurry on the top end of the substrate monoliths. This is important because an uneven distribution of the liquid slurry (washcoat) leads to an uneven distribution of the washcoat within the channels of such substrates after the suction step. This problem is said to be solved in these patent applications by rotating the substrate monolith or by applying a special nozzle technique.

The present invention is also concerned with the problem of metering a liquid coating slurry on the top end face of a monolith substrate in a way that the liquid coating slurry is distributed evenly over an area of the top end face of the substrate before it is going to be sucked and/or pressed in the substrate by applying a pressure difference across the channels of the respective substrate. The apparatus and the process involved should be advantageous in view of the prior art techniques from an economical and/or ecological point of view.

In a first aspect of the present invention there is provided an apparatus according to claims 1-6. Claims 7-10 are directed to the respective process, which defines the second aspect of the present invention.

According to the first aspect of the present invention, there is provided a substrate coating apparatus for the production of exhaust gas purification catalysts, particularly for motor vehicles, which are cylindrical support bodies and each have two end faces, a circumferential surface and an axial length L and are traversed from the first end face to the second end face by a multiplicity of channels, and for contacting the support bodies with a liquid coating slurry, said apparatus comprises
- a holding unit for reversibly holding the support body vertically;
- a dosing unit for supplying the liquid coating slurry onto the top end face of the support body;
- a unit for applying a pressure difference versus the support body, i.e. by applying a vacuum and/or a pressure to at least one end face of the support body; and wherein the dosing unit comprises a diffusor in the form of a flexible membrane, preferably a perforated membrane, through which the liquid coating slurry is applied to an area of the top end face of the support body preferably solely—when applying a pressure to the liquid coating slurry. By doing this the slurry is equally and evenly applied to that respective area of the top end of the support body. By using the special diffusor in the form of the flexible membrane it is surprisingly possible to apply a liquid coating slurry to at least an area of the top end face of a substrate monolith/support body in such a way that immediately after applying said slurry the liquid coating media is evenly distributed over that respective area without applying further measures. In the next step the unit for applying a pressure difference, i.e. suction unit and/or pressure unit, can right away pull-in and/or push-in the liquid coating media applied to the top end face of the support body into the channels and at least with regard to porous and/or ceramic support bodies possibly into the walls of the substrate to be coated.

The present apparatus is especially adapted to be part of a total coating station having a portion which delivers the support bodies to the coating apparatus and a portion which is associated with removing the support bodies from said apparatus. This can be done in several ways. E.g. the substrates can be supplied in a linear manner on conveyor belts to the coating apparatus and can be removed therefrom in a linear manner on such belts as well. Such coating stations have been disclosed for example in U.S. Pat. Nos. 4,208,454 and 3,959,520. Normally, afterwards the coated substrates are dried and calcined in special tunnel kilns (ZL201420301913.2; U.S. Pat. No. 8,476,559).

On the other hand so called rotatory indexing tables having a rotatory turntable for moving the support body to and away from the coating apparatus are known (EP2321048B1 and literature cited therein). In a preferred manner, the apparatus of the present invention is adapted to be part of a coating station and comprises a rotary turntable for supplying the support bodies to and removing the support bodies from said apparatus.

In a further preferred manner, the coating apparatus of the present invention is adapted to be part of the coating station, the apparatus further comprises means to turn the support bodies upside down within said apparatus. Means to do this are known from EP2321048B1 and literature cited therein. Further literature disclosing such means for inverting the support body within a coating apparatus being applicable in the present invention can be found here (WO2011080525; DE102009009579B4; JP2006021128; US20070128354A1).

The holding unit can be any holding unit known to the skilled worker for fixing the support bodies in the coating station prior to applying the liquid coating slurry. Normally, these are round or ellipsoidal tools being rigidly fixed to the coating station which have on their inner side an inflatable bellow (U.S. Pat. No. 4,609,563), the latter being inflated after the support body has been introduced into the holding unit thereby clamping it in a vertical position and building an almost airtight connection to it. These holding units have been described already frequently in the above referenced literature. In a preferred manner, this holding unit is arranged in a rotatory turntable device like indicated in EP2321048B1 and literature cited therein. Here the support body to be coated is delivered to the turntable and to the holding unit manually or via automatic means such as robot arms or the like.

A further preferred feature of the present invention is the presence of a suction unit which is established below the holding unit just described. After the holding unit has clamped the support body within the holding unit by, e.g. inflating the respective bellow at the inner side of the holding unit, the coating slurry is applied to the top end face of the substrate. Subsequently, the suction unit can establish a vacuum to the lower end of the support body, thereby sucking the coating slurry applied to the top end face through the channels and possibly into the walls of the respective substrate. Such suction units are already described in the above referenced prior art. In a preferred embodiment the suction unit comprises a coating chamber which is part of a coating station, as described e.g. in U.S. Pat. No. 8,794,178B2, with the exception that the coating slurry is applied to the top end face of the support body here. However, it is also embraced within the present invention that in an advantageous manner a first coating slurry can be applied in a first step to the top end face of a support body according to the invention with subsequently sucking the coating slurry through the channels and possibly into the walls of the substrate and subsequently applying a second coating slurry from the bottom of the support body as depicted for example in WO2015140630A1 or vice versa. In such a way two coatings can be applied to one and the same support body without moving or even inverting it. The first and the second coating slurry can be the same or different. The present process can thus lead to zone coated monoliths or double or triple layer coatings.

The present invention requires that the liquid coating slurry is applied to the top end face of the support body which is to be coated. The slurry can be subjected to the total top end face of the support body (like in EP2415522A1 or EP1900442A1) or only a part thereof. In order to be able to coat only a partial area of the top end face of the support bodies certain techniques have been established in the prior art and are disclosed for example in WO9947260A1. The latter is using kind of shutter, iris, or guillotine technique in order to exclude certain regions of the substrate monolith top end face from being coated. Same techniques can be preferably applied in the present invention also. In a preferred manner the dosing unit comprises a shutter unit which allows to apply the liquid coating slurry to part or all of the top end surface area of the support body.

The present invention uses a special device for dosing the liquid coating slurry onto the top end face of the support body to be coated. The dosing unit comprises a diffusor in the form of a flexible membrane through which the liquid coating slurry is subjected to the top end face or at least an area of this top end face of the support body. The membrane advantageously can be made out of a flexible material which is perforated by holes that open or widen, when a force other than gravimetric force is acting on a coating slurry lying on the membrane. Hence, the membrane needs to have a certain flexibility. As said the flexibility is needed due to the fact that it should be preferably substantially closed for the washcoat to run through while only gravimetric forces are apply but should be open to the washcoat when a certain additional pressure is imposed on the washcoat thus being pressed through the membrane. As an example in a very preferred manner, the membrane with a shore hardness of 50 ShA (shore A) on support plate with a 10 mm holes has a flexibility that the diameter of the holes of the membrane increase for a factor of at least 1.2, more preferred at least 1.4, and most preferred at least about 1.5-1.7 (e.g. from Ø 1 mm to 1.6 mm) by applying a pressure of >0-6 bar, preferably 2-5 bar and most preferably 3-4 bar to the washcoat slurry lying on the membrane.

Further, advantageously the membrane is stabilized by a support being a rigid, non-flexible plate or grid that is preferably supporting the membrane from below in view of the flow of the washcoat. Membrane and its support can form a composite. This support has openings, e.g. through holes, at the place where the membrane allows the washcoat to be supplied to the top of the substrate (FIG. 1). The supporting plate or grid is preferably made out of hard plastics, ceramics, or stainless steel material and has a sufficient high stiffness. The stiffness of the plate is such that the plate under the pressure applied during operation deforms only up to 1 mm. The thinner the plate the better. Hence, steel is preferably used as a support plate here. In an advantageous manner the plate or grid has through holes larger than the openings of the membrane under pressure. Ideally, the supporting plate or grid does not come into contact with the washcoat during application of the washcoat to the support body.

According to FIG. 1 a supporting plate is underlying the flexible membrane. The membrane has little holes like depicted in FIG. 1 [B(5:1)]. When pressure is applied to the washcoat sitting on top of the membrane, e.g. little through holes/openings are going to open a bit more and let the washcoat pass.

Figure 2:
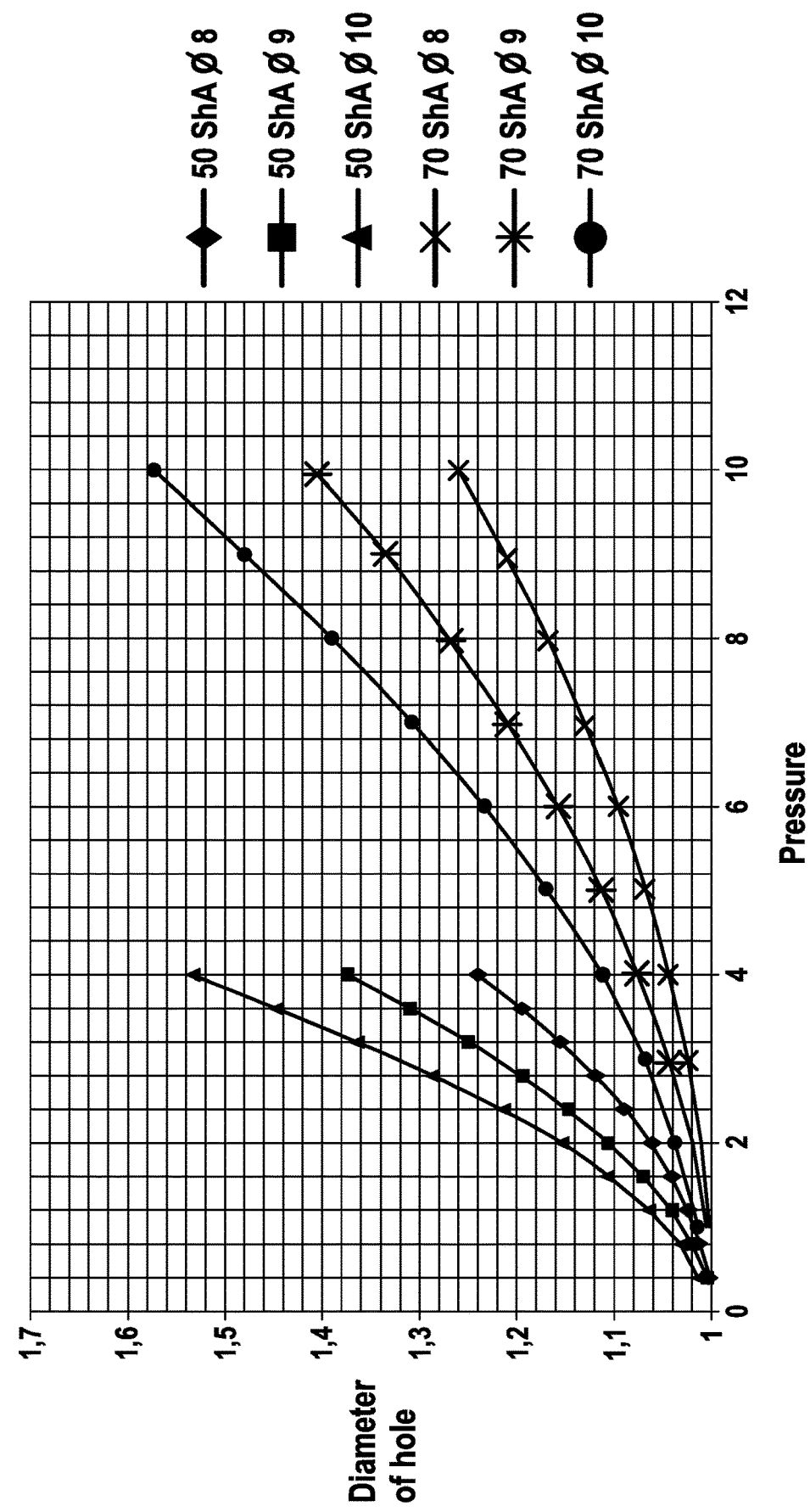

In FIG. 2 the flow through the membrane is calculated for two different flexibility regimes and three different openings of the support of the membrane. It can be seen that with this arrangement, i.e. a rubber membrane on top of a perforated support plate (i.e. FIG. 1), the membrane can be opened and closed depending on the additional pressure applied to the substance located on top of the membrane.

Figure 3:
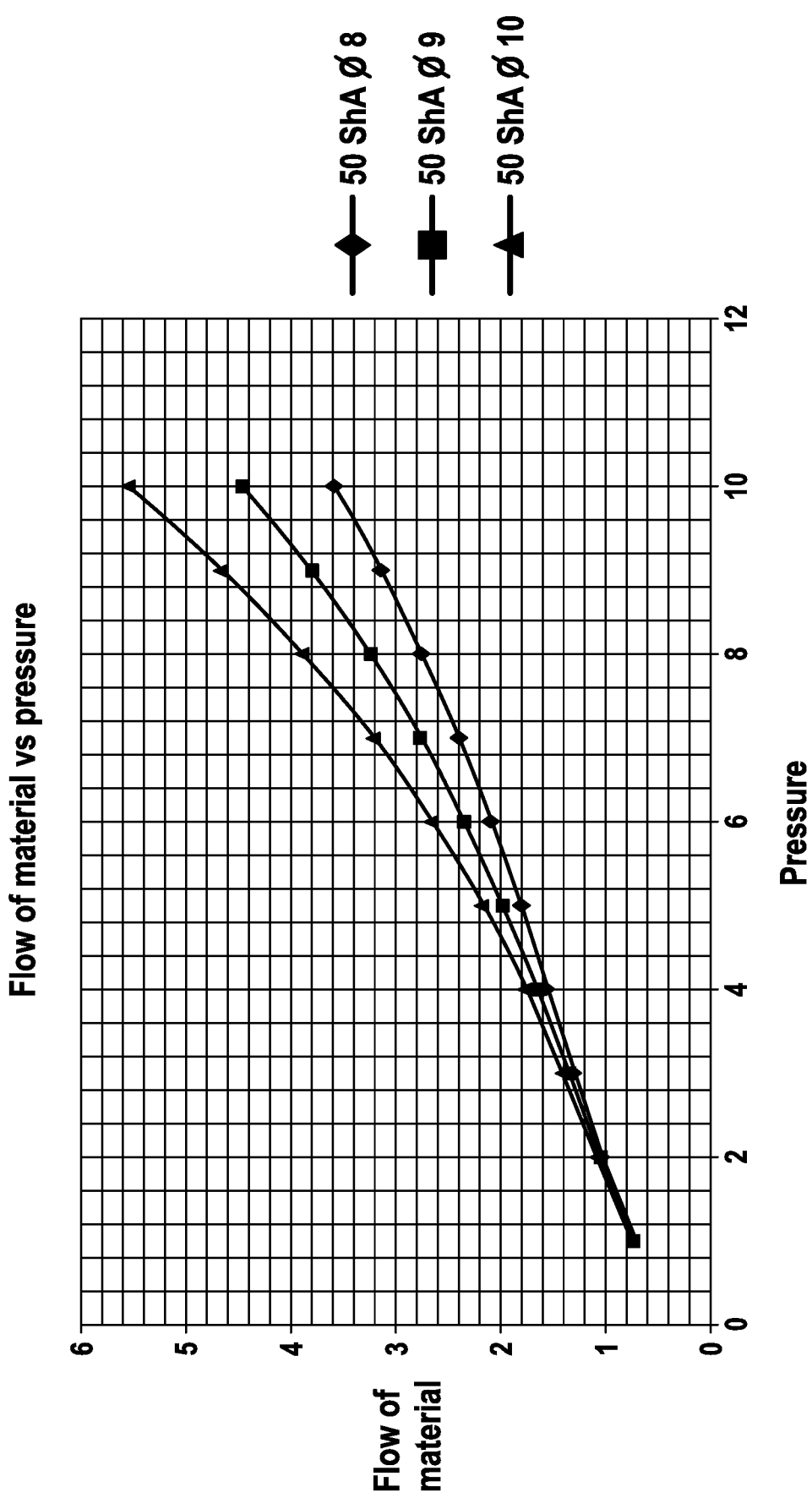

In FIG. 3 a calculation was done for 3 different liquids to simulate different washcoats with a viscosity from 0.001 to 10 Pa*s (Honey 10 pa*s, glycerin 1.422 Pa*s and water 1 mPa*s). The one example showed in FIG. 3 is glycerin having a viscosity of 1.422 Pa*s. This range of viscosities pretty much resembles the viscosities present in normal washcoats for automotive catalysts. The viscosity of coating suspensions and solutions varies from 0.001 Pa*s up to 100

Pa*s with typical values in the range of 0.01 to 10 Pa*s. Again one can see that the membrane with certain opening diameters is substantially closed for the washcoat on no pressure and open upon pressure being applied to the washcoat. The liquid coating medium often has a solids content of between 35% and 52%. If the liquid coating medium has a viscosity between 1-10 Pa*s optimal opening ranges of the flexible membranes can be between 1 to 2 mm, and for a viscosity between 0.01-1 Pa*s it is preferable to have an opening range between 0.5 to 1 mm. (Viscosities are measured according to DIN EN ISO 3104:1999-12 as of the filing day).

Advantageously the membrane is made out of a flexible organic material, e.g. some kind of natural or artificial elastomer (https://en.wikipedia.org/wiki/Elastomer). Materials taken into consideration by the skilled worker are those selected from the group consisting of natural or synthetic rubber, polyethylene propylene diene, or other flexible materials compatible with the washcoat chemistry. The membrane is most preferably made out of rubber like material. Preferably, the membrane has through holes or openings for the washcoat to flow through under the impact of pressure.

Depending on the material used for building the membrane and the viscosity of the washcoat used the holes have to be of a certain diameter. The openings can be determined by the skilled reader under the provisions of the invention. In practice, the holes advantageously have a minimum diameter from 0.01-3, more preferably 0.05-2 and most preferred from 0.1-1 mm. In addition, the shape of the holes can also be of importance. In a preferred embodiment the holes of the membrane have a wider diameter at the inlet side, i.e. the side towards the washcoat submission unit, as to the outlet side, i.e. the side towards the substrate. More preferably the inlet side of a hole has a size of a factor of 2-5, most preferred 3-4 of the size of the diameter at the washcoat outlet side of the hole.

The thickness of the membrane is chosen according to the skilled reader's knowledge. It depends also on the flexibility of the materials used for building the membrane. Preferably, the thickness of the membrane is from 2-15 mm, more preferably 2-10 mm and most preferably 2-5 mm. As can be seen from exemplary FIG. 1 the outlet side diameter of the openings prevails over a certain length of the cross-section of the membrane. Preferably, this area of the membrane openings extents over ⅙-½, more preferably ⅕-⅓ and most preferably over ¼-⅓ of the membrane thickness.

The number of openings and their distribution can be determined by the skilled reader. It can be of advantage to have differently sized and shaped holes within the flexible membrane. E.g. if less washcoat is to be submitted to the periphery of the substrate, and in the middle more washcoat is to be applied, a membrane can be used that is adapted to fulfill this profile, e.g. by establishing more or wider holes or openings in the middle compared to the periphery of the membrane. It has to be made clear though that also the underlying support plate or grid has to show a similar pattern with regard to the perforation in order to let the washcoat flow through the membrane holes (FIG. 1). The openings of this support are much wider than those of the membrane. In a preferred embodiment the openings of the support are wide enough to not contact the washcoat flowing through the membrane. On the other hand-side the rigid support can also be integrated into the membrane itself. E.g. a rigid grid or plate of hard plastics or metal or some other nonflexible or less flexible material within the knowledge of the skilled reader e.g. ceramics can be surrounded by the flexible membrane material and then through holes or openings are established through the flexible part of this composite device acting as a kind of diffusor. As such the skilled worker has to handle only the membrane and not the membrane plus the support plate individually when installing the device. Advantageously, as such there is no risk for the membrane shifting around over the supporting plate to the extent that both openings are not lying congruently over each other anymore, thus blocking the washcoat flow.

In a further aspect the present invention is concerned with a process for coating substrates for the production of exhaust gas purification catalysts, particularly for motor vehicles, which are cylindrical support bodies and each have two end faces, a circumferential surface and an axial length L and is traversed from the first end face to the second end face by a multiplicity of channels, with a liquid coating slurry, wherein an apparatus according to this invention is used.

First, a substrate to be coated is supplied to the holding unit by a robot or manually, the holding unit preferably being attached to a rotatory indexing turntable (EP2321048B1 and literature cited therein), the substrate being positioned vertically and fixed within holding means of the holding unit. In a next step the liquid coating slurry is applied at least to an area of the top end face of the substrate monolith according to this invention. By applying the liquid coating slurry through a flexible membrane acting as a diffusor—alike the shower head in EP2415522A1—the coating slurry is more evenly distributed over this respective area of the substrate. Subsequently, a thus applied coating slurry can be sucked or pressed into the channels or possibly the walls of the monolith in an even manner.

In a preferred process according to the present invention the substrate monoliths being coated as depicted above in a first coating step is subsequently turned around and subjected to a similar second coating step. Hence, by turning around the substrate after the first coating step, by e.g. some automatic means like robot arms, pivoting device etc., a second coating can be applied from the top to the opposite end thus leading to a zoned arrangement of coatings on the substrate and/or to partial or full (i.e. whole length L covered) double layers on one and the same substrate within one coating process. The coating layers can be made of the same or different materials.

In another very preferred embodiment the coating process is performed with a coating apparatus that is able to apply a first liquid coating slurry on the top end face of the substrate according to the present invention and in addition is also able to apply a second liquid coating slurry to the bottom end face of the substrate still being fixed in the holding unit. This process advantageously uses the techniques of e.g. the apparatus of WO2015140630A1 in connection with the concept of the present invention. As such, the coating apparatus of the present invention also comprises a first means for reversibly holding and fixing a catalyst support body to be coated with a washcoat vertically, and a second means to control the inflow of the washcoat into the monolith from below, wherein said second means is attached to said first means such that during the coating process said second means comes into contact with the washcoat before it reaches the monolith; said second means has the form of a plate comprising holes having, when in use, an inlet side towards the washcoat and an outlet side towards the support body, and channels providing a communication from the inlet side to the outlet side for the washcoat to flow through, wherein at least part of said channels have an asymmetric channel width along their axis being wider at the washcoat inlet side than at a point within the channels, and said asymmetric holes are wider at the washcoat outlet side than at a point within the channels, and the area which is narrower than outlet and inlet of the holes, is at least for some of the holes aligned more closely to the outlet than to the inlet side.

In a further preferred mode of the process of the invention, the coating apparatus of the present invention comprises a containment vessel and a leveling unit which is able to equalize the surface of washcoat applied to the containment vessel before the unit for applying a pressure difference versus the support body becomes active to introduce the washcoat into the support body. Here, prior to introduction into the substrate, the first washcoat slurry is delivered to a containment vessel that is adapted for fluid-flow communication with the end face of the substrate body. When washcoat is to be introduced through the top end face of the substrate body, the containment vessel may be an annular wall that is releasably mountable to the top end of the substrate. Once received in the containment vessel, and prior to introduction into the substrate, the first catalyst slurry is preferably distributed and uniformly leveled by application of a shearing force, such as by inducing a vibration (and hence some shear forces) in the first catalyst slurry and/or the containment vessel (WO07007370 A1) as a whole (e.g., a mechanized vibration; application of ultrasound or infrasound energy; stream of air; mechanical flattening; use of centrifugal force etc.). Leveling of the catalyst slurry in the containment vessel further promotes an even surface of the washcoat and, hence, an even distribution of the catalyst slurry along the channel walls of the substrate, and generates the formation of a uniform catalyst layer on the support body. The leveling is preferably working in a modus where the shear forces impact on the washcoat in the containment vessel via contactless measures, e.g. by ultra- or infrasound or a simple stream of air onto the surface of the washcoat, e.g. provided by a certain air-blowing nozzle.

Surprisingly it is possible to coat a substrate with several liquid coating slurries with or without turning or moving the part around. By doing this a substrate monolith can be coated from the same or different sides of the end faces with the same or different coating slurries to achieve a zoned or layered concept as depicted above with regard to the coatings on the substrate monoliths in a minimum of time and with less complexity of the coating process.

The coating apparatus used according to the invention can be designed as mentioned e.g. in WO2011098450A1 or WO2010114132A1. The first washcoat is introduced into the support body under conditions that are predetermined to form a first washcoat layer in wet state along a length of the channels that is up to but preferably less than 100% of the total length of the monolith carrier; more preferably a length equal to or greater than about 85% and less than 97%; and yet more preferably a length equal to or greater than about 90% and equal to or less than about 95%, although any length less than 100% may be desirable based on application. Targeting less than 100% of the total length of the carrier also provides further benefits including, though not limited to, mitigating the unintended spillover of washcoat slurry through the opposite end face of the carrier; and suppressing particle size and compositional drift issues (e.g., formation of a gradient), thereby promoting a uniform application of the applied washcoat layer.

Preferably, when turning around the monolith carrier this can be done with means known to the skilled worker, like robot arms etc. or even manually. Again, the second washcoat can be introduced as a slurry under conditions that are predetermined to form a second washcoat layer in wet state at least partially over the first washcoat and along a length of the channels that is up to but preferably less than 100% of the total length of the monolith carrier; more preferably a length equal to or greater than about 85% and less than 97%; and yet more preferably a length equal to or greater than about 90% and equal to or less than about 95%, although any length less than 100% may be desirable based on application. Targeting less than 100% of the total length of the carrier also provides further benefits including, though not limited to, mitigating the unintended spillover of washcoat slurry through the opposite end face of the substrate; and suppressing particle size and compositional drift issues (e.g., formation of a gradient), thereby promoting a uniform application of the applied catalyst layer.

In view of coating two or more washcoat slurries onto each other without further drying the underlying washcoat, some solidification or hardening of the underlying washcoat has to occur in order to get a separate overlying washcoat layer. It is for example possible to use from below or from the top of the support body a stream of a respective acidic or basic gas or liquid to be conveyed through the channels of the support body. On reaction of the acidic or basic gaseous or liquid stream with the washcoat, the latter then hardens and solidifies to the necessary extent that it is ready to be overcoated by the same or a different second washcoat without drying in between, which means that the support body is not removed from the holding unit for the purpose of removing liquid components from the applied washcoat by a heat and air-flow treatment (i.e. normal drying process) of the support body.

In order to solidify a coated washcoat on a monolith carrier according to the procedure of the present invention the applied washcoat has to have the ability to become pseudoplastic upon treatment with a liquid or gaseous acid or base. Although theoretical considerations have also been carried out regarding the behavior of metal oxide suspensions on pH-treatment (Tombácz et al., Progr. Colloid Polym. Sci (1995), 98, 160-168; Zhou et al., Chemical Engineering Science (2001), 56, 2901-2920), due to the fact that the washcoat slurries which are coated on such monolith carriers, are complex mixtures of several components some tweaks (solid/liquid ratio, temperature, additives, etc.) may be needed to generate a washcoat will in fact show this pseudoplastic behavior. However, this can be checked by the skilled worker in preliminary trials as depicted in the examples and the attached figures.

The acidic liquid or the acidic gaseous stream which is to be submitted to the monolith carrier after a washcoat has been coated on or in its channel walls can be selected by the skilled worker based on feasibility, cost and safety considerations. In a preferred embodiment the acidic component of then liquid or the gaseous stream is selected from the group of $C_1$-$C_4$-branched or unbranched, saturated or unsaturated organic acid, and inorganic acid, such as $HNO_3$, $HCl$, $H_2SO_4$, $H_3PO_4$. Within the group of organic acids formic acid, acetic acid or propionic acid, preferably as an aqueous solution or as an aerosol or in a steam format are particularly advantageous.

The basic liquid or the basic gaseous stream which is to be submitted to the monolith carrier after a washcoat has been coated on or in its channel walls can be selected by the skilled worker based on feasibility, cost and safety considerations. In a preferred embodiment the basic component of the liquid or the gaseous stream is selected from the group of ammonia, $CO_2$, alkaline salt of a $C_1$-$C_4$-branched or unbranched, saturated or unsaturated organic acid as depicted above.

As such the acidic or basic component cited above is applied to the washcoat on or in the walls of the monolith carrier in form of a liquid medium or a gaseous stream. When talking about a gaseous stream, this can be a pure gas, an aerosol, or a stream in a steam format. The skilled worker knows how to produce such streams (https://en.wikipedia.org/wiki/Aerosol; https://en.wikipedia.org/wiki/Steam). The liquid medium most preferably is a solution of the component in water. Its concentration is not that critical. It has to be enough of the component in the liquid medium to produce the necessary effect though.

In addition, one can stimulate the effect of pseudoplastic behavior upon acidic or basic treatment by adding certain compounds to the washcoat to be supplied to the monolith carrier. As such, compounds like depicted in WO2016023808A, U.S. Pat. No. 9,144,796B1 and literature cited therein for intensifying a pseudoplastic behavior of a washcoat can be taken (rheology modifiers). Furthermore, the list of the following compounds can render the washcoat even more susceptible for such pseudoplastic behavior. Rheological aids for setting a pseudoplastic behavior have long been known. An overview of useful rheology modifiers can be found in the publication of D. Brown and M. Rosen (The Rheology Modifier Handbook Author: David B. Brown and Meyer R. Rosen ISBN 0-8155-1441-7 Published: 1999).

Furthermore, the list of the following compounds can render the washcoat more pseudoplastic. A first set of compounds that may provide suitable rheology modifiers are linear or branched-chain poly-functionalized organic molecules having two or more carbon atoms in the chain, with up to about 12 carbon atoms (Cn; wherein $2 \leq n \leq 12$). The carbon backbone may be saturated or unsaturated in either the cis- or trans-configuration. The organic molecule may be functionalized with at least one carboxylic acid moiety, and at least one additional functional moiety from the following list: carboxyl, hydroxyl, or carbonyl. The number of functional moieties can range from 2 to n. Preferred are those having the structure of dicarbonic acid, like eg. oxalic acid, tartratic acid, etc.

A second set of compounds that may provide suitable rheology modifiers are based on salts of basic quaternary amines. Here one or more quaternary amine groups are attached to four carbon chains having length of Cn, where $1 \leq n \leq 5$. This cation is balanced as a salt using, but not limited to, one of the following anions: hydroxide, fluoride, chloride, bromide, iodide, carbonate, sulfate, sulfite, oxalate, maleate, phosphate, aluminate, silicate, borate, or other suitable organic or inorganic counter ions.

A third set of compounds that may provide suitable rheology modifiers includes inorganic bases taken from, but not limited to the following list: lithium hydroxide, sodium hydroxide, potassium hydroxide, magnesium hydroxide, calcium hydroxide, strontium hydroxide, and barium hydroxide.

A fourth set of compounds that may provide suitable rheology modifiers includes simple salts of transition or rare earth elements, including, but not limited to the following: nitrates, carbonates, sulfates, phosphates, borates of rare earth elements from atomic number 57 (La) to 71 (Lu) and including Sc, Y, Ti, Zr, and Hf.

The rheological properties of the various catalyst slurries may be adjusted by providing the washcoat of the respective catalyst slurries with any appropriate combination of the above referenced compounds, including combinations of compounds in a common set (e.g., two or more compounds from the second set) and combinations of compounds from different sets (e.g., one compound from the first set; and two compound from the third set).

The rheology modifiers are added in weight percent concentrations of 0.01% up to 10%, preferably from about 0.1% to about 7.5%; and more preferably from about 0.1% to about 5%. The predetermined initial viscosities of the separate catalyst slurries, and the differences between the respective initial viscosities, may be adjusted by selecting different rheology modifiers (or combinations thereof) and/or adjusting the weight percent of the one or more rheology modifiers for each catalyst slurry.

Preferably, the carrier coated according to the present invention is a flow-through or a wall-flow monolith. Suitable substrates that can be employed in the present invention are monolithic substrates of the type having fine, parallel gas flow passages extending there through from an inlet or an outlet face of the substrate, such that passages are open to fluid flow there through, named honeycomb flow-through substrates. The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$). The wall thicknesses, i.e. the thickness of the walls which separate the channels of the substrate from one another, are usually from about 0.005 cm to about 0.25 cm.

Suitable substrates that can be employed are monolithic substrates/support bodies of the type having fine, parallel gas flow passages extending there through from an inlet or an outlet face of the substrate, such that passages are open to fluid flow there through, named honeycomb flow-through substrates. The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$). The wall thicknesses, i.e. the thickness of the walls which separate the channels of the substrate from one another, are usually from about 0.005 cm to about 0.25 cm.

The substrate to be coated according to the invention may preferably also be a honeycomb wall-flow filter. Wall-flow substrates useful for supporting the coating compositions have a plurality of fine, substantially parallel gas flow passages extending along the longitudinal axis of the substrate. Typically, each passage is blocked at one end of the substrate body, with alternate passages blocked at opposite end-faces. Specific wall-flow substrates for use in the inventive process include thin porous walled honeycombs (monoliths/support bodies) through which the fluid stream passes without causing too great an increase in back pressure or pressure drop across the article. Normally, the presence of a clean wall-flow article will create a back pressure of 0.036 psi to 10 psi.

The above mentioned substrates are preferably metal or ceramic-like monoliths, the latter are made out of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. In view of flow-through monoliths, which are suitable for the production of exhaust gas catalysts for motor vehicles according to the present process, they preferably have a porosity of more than 20%, generally from 20% to 55%, in particular from 22% to 50% prior to coating [measured according to DIN 66133 as of the application date]. The mean pore size is at least 1 µm, e.g. from 1.5 µm to 15 µm, preferably more than 3 µm, in particular from 5 µm to 9 µm or from 10 µm to 15 µm prior to coating [measured according to DIN 66134 as of the application date]. Finished substrates suitable for the exhaust gas catalysis of motor vehicles which originally have a mean pore size of 5 to 15 µm and a porosity of 25% to 40% are particularly advantageous. In view of ceramic wall-flow filter substrates, which are suitable for the production of exhaust gas filters for motor vehicles according to the present process, they preferably have a porosity of more than 40%, generally from 40% to 75%, in particular from 45% to 70% [measured according to DIN 66133 as of the application date]. The mean pore size is at least 7 µm, e.g. from 7 µm to 34 µm, preferably more than 10 µm, in particular from 10 µm to 20 µm or from 21 µm to 33 µm [measured according to DIN 66134 as of the application date]. Finished substrates suitable for the production of exhaust gas filters for motor vehicles which originally have a mean pore size of 10 to 33 µm and a porosity of 50% to 65% are particularly advantageous.

When substrates with the aforementioned porosities and mean pore sizes are coated with a washcoat, adequate levels of the coating compositions can be loaded onto and/or into the pores of the substrates to achieve excellent pollutant conversion efficiency and, in view of filters, burning off of soot. These substrates are still able to retain adequate exhaust flow characteristics, i.e., acceptable back pressures, despite the catalyst loading.

The expression "coating" is to be understood to mean the application of catalytically active materials and/or storage components for noxious exhaust pollutants on a substantially inert substrate which may be constructed in the manner of an above-described wall-flow filter or flow-through monolith. The coating performs the actual catalytic function and contains storage materials and/or catalytically active metals which are usually deposited in highly dispersed form on temperature-stable, large-surface-area metal oxides (see below). The coating is carried out usually by means of the application of a liquid coating medium of the storage materials and/or catalytically active components—also referred to as a washcoat—onto and/or into the wall of the inert substrate. After the application of the liquid coating medium, the support is dried and if appropriate calcined at elevated temperatures. The coating may be composed of one layer or constructed from a plurality of layers which are applied to a substrate one above the other (in multi-layer form) and/or offset with respect to one another (in zones).

The liquid coating medium/slurry is, for example, a suspension or dispersion ("washcoat") for coating exhaust gas catalysts (flow-through monoliths or filters) for motor vehicles which contains the storage materials and/or catalytically active materials or precursors thereof and/or inorganic oxides such as zeolites, like CHA, LEV or similar 8-ring zeolites, or refractory oxides like aluminum oxide, titanium dioxide, zirconium oxide or a combination thereof, it being possible for the refractory oxides to be doped with silicon or lanthanum, for example. The zeolites can be exchanged with metal cations like Fe and/or Cu. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both of these components.

In view of the here described process the preferred embodiments of the initial apparatus apply mutatis mutandis and vice versa. In a further preferred aspect the present invention is directed to a coating station which comprises the apparatus according to the present invention. Also here the preferred embodiments of the process and/or the apparatus disclosed apply mutatis mutandis to the coating station. This is the case in particular for the more mechanical aspects discussed in connection with the above mentioned process and/or apparatus, like e.g. rotatory turntable, robot arm for loading and unloading or turning around the substrate within the holding unit and the possibility to coat the substrate monoliths from both end sides without turning around the substrate.

FIGURES

FIG. 1: Shows the membrane supported by the plate with respective, exemplary openings.

FIG. 2: Calculation results for membranes having an opening of 1 mm with different diameters of openings of the supporting stainless steel plate and different flexibilities and medium having a viscosity of 1.49 Pa*s.

FIG. 3: Calculation results for membranes with different openings and a medium having a viscosity of 1.49 Pa*s.

Figure 4:
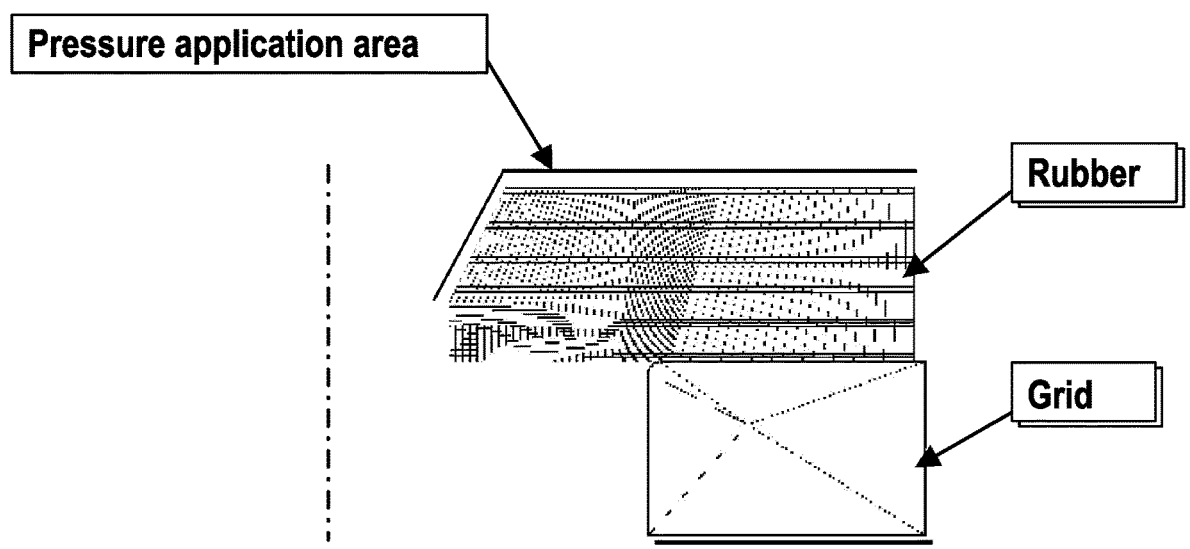

FIG. 4: Model for calculation.

Figure 5:
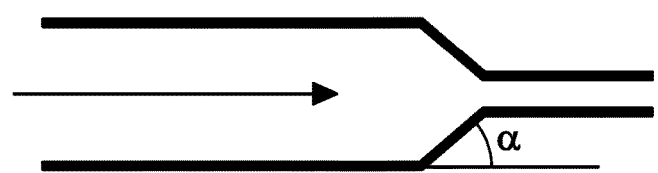

FIG. 5: Flow line applied for computation.

EXAMPLES

Finite Element Analysis Description

1. Computation Parameters

Computation is led in 2D axisymmetric. We are using a Mooney Rivlin hyper elastic behavior low.

Rubber characteristics are 70 and 50 shore A rubber compound.

Grid material is considered as non-deformable.

Friction rate is 0.5.

2. Initial Conditions
For the computation, we applied the loading below:
Pressure application on the spay device internal side. See FIG. 4.
Computation is carried out for three different hole diameters on the grid.
_Ø 8
_Ø 9
_Ø 10
3. Computation Description (Flow/Pressure)
3.1 Computation Hypothesis
For the computation, it will be used the Bernoulli theorem applied to a flow line that run through the FIG. 5.
S1 is the entry section and S2 the exit section.
Lost charge coefficient is according to:

$$K = \left(\frac{1}{0.59 + 0.41\left(\frac{S_1}{S_2}\right)^3} - 1\right)^2 \sin(\alpha)$$

Considered for the equation is the hypothesis below:
No regular loss of charges,
Laminar flow (Re<2000), $$v = \frac{R^2 \Delta p}{4\mu\rho}$$

v=Maximum fluid speed in a cylindrical pipe
μ=Dynamic fluid viscosity in Poise
R=Pipe radius in meter
Δp=Pressure difference observed in the pipe in Pascal
ρ=specific gravity [kg/m$^3$]
Reminder Bernoulli formula:

$$\alpha_1 \frac{v_{1m}^2}{2g} + \frac{p_1}{\rho g} + z_1 = \alpha_2 \frac{v_{2m}^2}{2g} + \frac{p_2}{\rho g} + z_2 + \sum_i \Lambda_i \frac{L_i}{D_i} \frac{v_i^2}{2g} + \sum_j K_j \frac{v_j^2}{2g}$$

α=Coefficient that describe type of flow (α=1 turbulent flow, α=2 laminar flow)
$v_{1m}$=Fluid average speed in the pipe (section S1)
$v_{2m}$=Fluid average speed in the pipe (section S2)
Z=Altitude of considered point in meter
g=acceleration 9.81 ms$^{-2}$
Λ=Regular loss of charge factor
L=Pipe length of similar section in meter
D=Pipe diameter in meter
K=Singular loss of charge factor $Q=v*S$ Q=Flow L/s
V=Average speed
S=Pipe section considered
The below relation will allow us to raise an Excel file in order to draw flow/pressure curves of the selected fluids.

$$Q = S2 \sqrt{\frac{1}{2\rho}\left[2\Delta p + \rho\left(\frac{R1^2 \Delta p}{4\mu\rho}\right)^2\right] * \left[2 - \left(\frac{1}{0.59 + 0.41\left(\frac{S2}{S1}\right)^3} - 1\right)^2 * \sin(\alpha)\right]}$$

Considered Fluids Parameters
α=90°

|  | Dynamic viscosity μ | Specific gravity kg/m^3 |
|---|---|---|
| Water | 0.001002 | 1000 |
| Glycerin | 1.49 | 1291 |
| Honey | 10 | 1422 |

The invention claimed is:

1. A substrate coating apparatus for the production of exhaust gas purification catalysts, which are cylindrical support bodies and each have two end faces, a circumferential surface and an axial length L and are traversed from the first end face to the second end face by a multiplicity of channels, and for contacting the support bodies with a liquid coating slurry;
said apparatus comprises
a holding unit for reversibly holding the support body vertically;
a dosing unit for supplying the liquid coating slurry onto the top end face of the support body;
a unit for applying a pressure difference versus the support body to introduce the liquid coating slurry into the support body; wherein
the dosing unit comprises a diffusor in the form of a flexible membrane through which a quantity of the liquid coating slurry is dosed from a supply source by diffusing through the diffusor under pressure to achieve a desired dosing amount of the liquid coating slurry that is applied to an area of the top end face of the support body; and wherein the unit for applying a pressure difference is configured to introduce the liquid coating slurry into the support body subsequent to the dosing unit having provided the desired dosing amount onto the area of the top end face of the support body.

2. Apparatus according to claim 1, wherein
said apparatus comprises a rotary turntable for supplying the support bodies of the exhaust gas purification catalysts to, and removing the coated support bodies from, the dosing unit.

3. Apparatus according to claim 1, wherein
said apparatus comprises a means to turn the support bodies upside down within said apparatus.

4. Apparatus according to claim 1, wherein
the holding unit is arranged in a rotatory turntable device.

5. Apparatus according to claim 1, wherein
a suction unit is adapted such that a first coating slurry can be applied in a first step to the top end face of a support body with subsequently sucking the coating slurry through the channels and possibly into the walls of the support body and subsequently applying a second coating slurry from the bottom of the support body.

6. Apparatus according to claim 1, wherein
the dosing unit comprises a shutter unit which allows to apply the liquid coating slurry to part or all of the top end surface area of the support body.

7. Apparatus according to claim 1, wherein the diffusor in the form of the flexible membrane and a membrane support, and wherein both the flexible membrane and the membrane support have a plurality of liquid coating slurry passageway through-holes that are arranged as to prevent liquid coating slurry contact with the through-holes in the membrane support during liquid coating slurry application through the flexible membrane and across the area of the top end face of the support body.

8. Apparatus according to claim 7, wherein the liquid coating slurry passageway through-holes of the flexible membrane are in a one-to-one relationship with the through-holes in the membrane support.

9. Apparatus according to claim 7, wherein the through-holes of the flexible membrane and the through-holes of the membrane support share a common central axis extending in a flow direction of the liquid coating slurry.

10. Apparatus according to claim 7 wherein the through-holes of the flexible membrane have a diameter that is less than the through-holes of the membrane support, both before and after a pressure expansion of the through-holes of the flexible membrane.

11. Apparatus according to claim 7, wherein the through-holes of the flexible membrane include both (i) a first diameter, first liquid slurry contact region, and (ii) a second diameter, later liquid slurry contact region, and the membrane support includes a third diameter through-hole, with the third diameter being larger than each of the first and second diameters, respectively, and the first diameter being larger than the second diameter.

12. Apparatus according to claim 7, wherein the membrane support is formed of a more rigid material than that of the flexible membrane, and the membrane support has an underlying surface of that more rigid material that is exposed in a direction facing the top end of the support body.

13. Apparatus according to claim 1, wherein the diffuser is arranged relative to the top end of the support body as to provide for full dosed amount supply prior to operation of the unit for applying a pressure difference.

14. Process for coating substrates for the production of exhaust gas purification catalysts, comprising: utilizing the apparatus of claim 1 to supply the multiplicity of channels of the support body with the liquid coating slurry.

15. Process according to claim 14 comprising the steps:
performing a first coating step;
turning the support body upside down within that apparatus;
performing a second coating step.

16. Process according to claim 14,
wherein
the support body is a ceramic or metallic honeycomb flow-through monolith or wall-flow filter.

17. Process according to claim 14,
wherein
the liquid coating slurry has a viscosity of from 0.01-10 Pa*s 20° C.

18. A substrate coating apparatus for the production of exhaust gas purification catalysts which comprise support bodies with first and second end faces and an axial length L, and are traversed from the first end face to the second end face by a multiplicity of channels, and for contacting the support bodies with a liquid coating slurry;
said apparatus comprises
a holding unit for reversibly holding the support body vertically;
a dosing unit for supplying the liquid coating slurry onto the top end face of the support body;
a unit for applying a pressure difference versus the support body to introduce the liquid coating slurry into the support body; and
wherein the dosing unit comprises a diffusor in the form of a flexible membrane and a membrane support through which the liquid coating slurry is applied to an area of the top end face of the support body when applying a pressure to the liquid coating slurry, wherein the flexible membrane has a plurality of liquid slurry flow passageway through-holes with each having a central liquid slurry flow axis in common with respective liquid slurry flow passageway through-holes provided in the membrane support, and wherein the liquid coating slurry passageway through-holes of the flexible membrane are in a one-to-one relationship with the through-holes in the membrane support.

19. Apparatus according to claim 18, wherein a minimum diameter of the through-holes in the membrane support is sufficiently larger than an exit port diameter of the flexible membrane through-holes as to avoid having the membrane support come in contact with liquid slurry passing through the flexible membrane to the support body.

20. A substrate coating apparatus for the production of exhaust gas purification catalysts which comprise support bodies with first and second end faces and an axial length L, and are traversed from the first end face to the second end face by a multiplicity of channels, and for contacting the support bodies with a liquid coating slurry;
said apparatus comprises
a holding unit for reversibly holding the support body vertically;
a dosing unit for supplying the liquid coating slurry onto the top end face of the support body;
a unit for applying a pressure difference versus the support body to introduce the liquid coating slurry into the support body; and
wherein the dosing unit comprises a diffusor in the form of a flexible membrane and a membrane support through which the liquid coating slurry is applied to an area of the top end face of the support body when applying a pressure to the liquid coating slurry, and wherein both the flexible membrane and the membrane support have a plurality of liquid coating slurry passageway through-holes that are arranged as to prevent liquid coating slurry contact with the through-holes in the membrane support during liquid coating slurry application through the flexible membrane and onto a top positioned end face of the support body.

21. Apparatus according to claim 20, wherein both the flexible membrane and the membrane support have a plurality of liquid coating slurry passageway through-holes that are arranged in a one-to-one relationship.

22. Apparatus according to claim 20, wherein the unit for applying a pressure difference is configured to introduce, subsequent to application of the dosed amount applied to the area on the top end face of the support body, the dosed amount into the support body.

* * * * *